(12) United States Patent
Burnett et al.

(10) Patent No.: US 9,680,874 B1
(45) Date of Patent: Jun. 13, 2017

(54) CONTAINERIZED EXAMINATION OF SENSITIVE DATA

(71) Applicant: AMAZON TECHNOLOGIES, INC., Seattle, WA (US)

(72) Inventors: Joseph Whitney Burnett, Seattle, WA (US); Todd Vaughn Jonker, Seattle, WA (US)

(73) Assignee: Amazon Technologies, Inc, Seattle, WA (US)

( * ) Notice: Subject to any disclaimer, the term of this patent is extended or adjusted under 35 U.S.C. 154(b) by 127 days.

(21) Appl. No.: 14/547,603

(22) Filed: Nov. 19, 2014

(51) Int. Cl.
*H04L 29/06* (2006.01)
*G06Q 50/26* (2012.01)

(52) U.S. Cl.
CPC .......... *H04L 63/20* (2013.01); *G06Q 50/265* (2013.01)

(58) Field of Classification Search
CPC ....... H04L 63/20; G06Q 50/265; G06F 21/53; G06F 21/74; G06F 21/602
USPC ........................................................ 726/1
See application file for complete search history.

(56) References Cited

U.S. PATENT DOCUMENTS

2004/0105298 A1* 6/2004 Symes .................. G06F 9/4812
365/149

OTHER PUBLICATIONS

Arfaoui, G., Gharout, S., & Traoré, J. (Apr. 2014). Trusted execution environments: a look under the hood. In Mobile Cloud Computing, Services, and Engineering (MobileCloud), 2014 2nd IEEE International Conference on (pp. 259-266). IEEE.*
Bugiel, Sven, et al. "Twin clouds: An architecture for secure cloud computing." Workshop on Cryptography and Security in Clouds (WCSC 2011). 2011.*

* cited by examiner

*Primary Examiner* — Syed Zaidi
(74) *Attorney, Agent, or Firm* — Lindauer Law, PLLC (57) ABSTRACT

Techniques are described for examining data that may be communicated to a recipient in an item such as a gift certificate. In some cases, the data may include personal information, financial data, or otherwise sensitive data. To prevent inadvertent leakage of sensitive data to unauthorized processes or individuals, the sensitive data may be placed in a portion of memory that is accessible by authorized software modules. The modules may execute in a container that has access to the portion of memory. In some cases, a module may expose functions that are callable from outside the container. The functions may examine the data to determine whether portions of the data comply with requirements. The return values of the functions may indicate the results of the examination of the data without communicating the examined data.

20 Claims, 8 Drawing Sheets

DATA EXAMINATION
MODULE
122

⋮

```
(define must
  (lambda (pred failure)
    (unless pred failure)))

(define date_within_1_hour
  (lambda (path)
    (> (data_at path) (- (timestamp_to_epoch_millis (timestamp_now)) 3600000))))

(define have
  (lambda (path)
    (if (is_void (data_at path)) false true)))

(define equal
  (lambda (value path)
    (assert (comparable value) "Non-comparable value provided to equals.")
      (safe_equal value (data_at path))))

(define be_a
  (lambda (type path)
    (or (if (safe_equal type "STRING") (is_string (data_at path)) false)
        (if (safe_equal type "INT") (is_int (data_at path)) false)
        (if (safe_equal type "DECIMAL") (is_decimal (data_at path)) false)
        (if (safe_equal type "BOOL") (is_bool (data_at path)) false)
        (if (safe_equal type "LIST") (is_list (data_at path)) false)
        (if (safe_equal type "STRUCT") (is_struct (data_at path)) false))))
```

CONTAINERIZED EXAMINATION OF SENSITIVE DATA

BACKGROUND

A business, government entity, or other organization may process and store large amounts of data associated with users, customers, products, services, vendors, finances, or operations generally. In some cases, the stored data may include sensitive data describing financial accounts, personal identification information, private health information, and so forth. An organization may implement processes and standards to ensure that such sensitive data is kept confidential, and is not accessible outside the organization or by unauthorized personnel within the organization.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for examining data to determine whether the data complies with requirements associated with the presentation of the data in a user interface (UI), in a message of a particular format, or according to other modes of presentation. In some cases, the examined data may include sensitive data such as personal identification information, personal messages, financial data, health data, and so forth. To ensure the security and confidentiality of the sensitive data, the sensitive data may be examined within an execution environment that is accessible to some, but not all, software modules executing on one or more computing devices.

Figure 1:
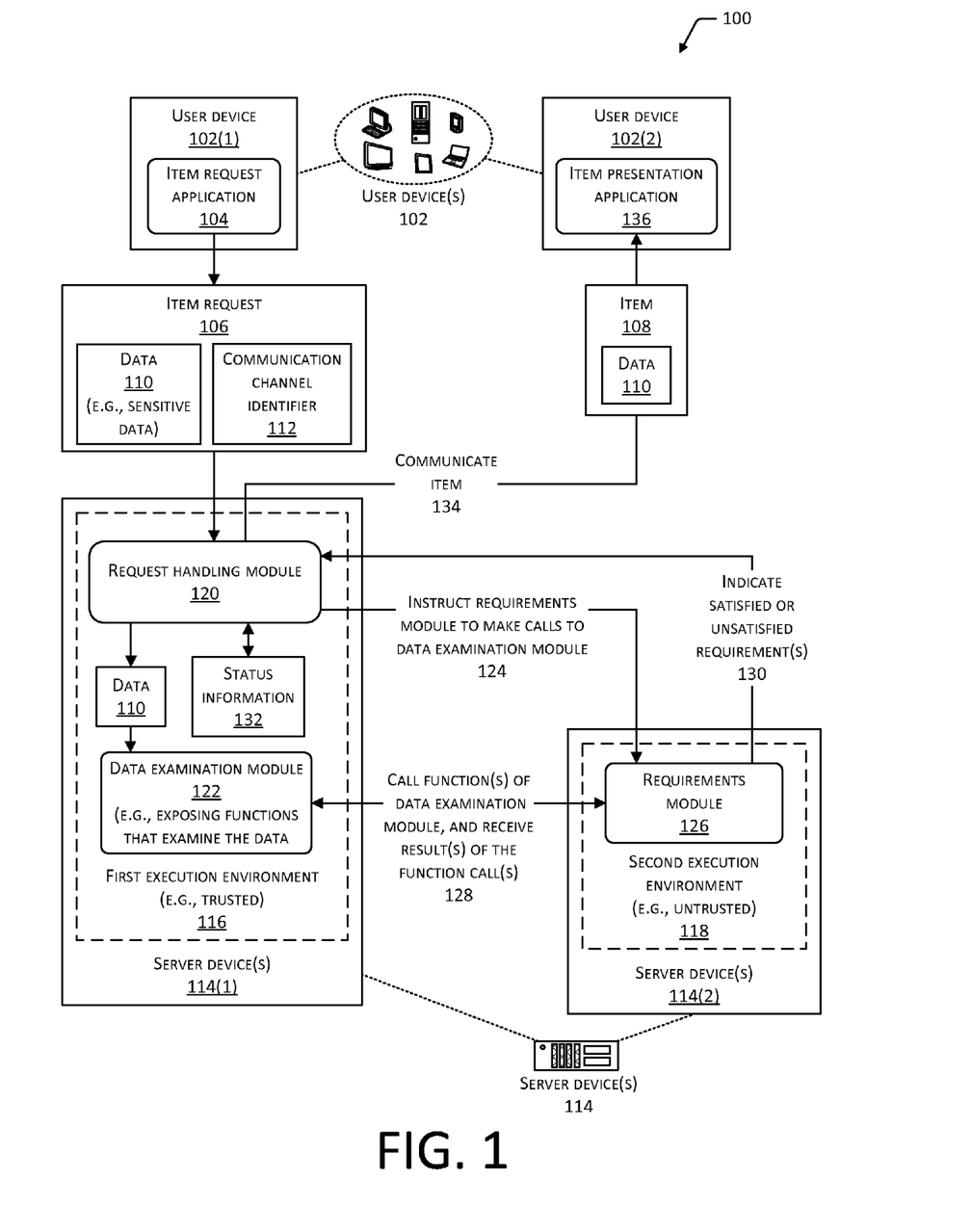
FIG. 1 depicts an environment for containerized examination of data that may include sensitive data to be communicated in an item such as a gift certificate.

FIG. 1 depicts an environment 100 in which implementations may operate. As shown in FIG. 1, the environment 100 may include one or more user devices 102. The user device(s) 102 may comprise any type of computing device, including but not limited to a personal computer, a smartphone, a tablet computer, a wearable computer, an implanted computer, a mobile gaming device, an e-book reader, an automotive computer, a desktop computer, a laptop computer, a game console, a home entertainment device, a network computer, a server computer, a mainframe computer, a distributed computing device (e.g., a cloud server), and so forth. Although examples herein may describe the user device(s) 102 as physical device(s), implementations are not so limited. In some cases, the user device(s) 102 may include one or more of a virtual computing environment, a hypervisor, a device emulation, or a virtual machine executing on one or more physical computing devices. In some cases, two or more of the user devices 102 may comprise a cluster, cloud, farm, or other grouping of multiple devices that coordinate operations to provide load balancing, failover support, parallel processing capabilities, shared storage resources, or other aspects. The user device(s) 102 are described further with reference to FIG. 4.

The user device(s) 102 may execute an item request application 104. In some implementations, the item request application 104 may be a web application configured to execute, at least partly, in a web browser. Accordingly, the item request application 104 may include any number of web pages that are described at least in part using a markup language such as any version of Hypertext Markup Language (HTML), Dynamic HTML (DHTML), Extensible HTML (XHTML), Extensible Markup Language (XML), and so forth. In some cases, the item request application 104 may also include dynamic scripting or programmatic elements described using any programming language, such as JavaScript™, ActiveScript™, VBScript™, Perl™, and so forth. Implementations support the use of any web browser to execute the item request application 104, including but not limited to one or more of the following: Mozilla Firefox™; Microsoft Internet Explorer™; Google Chrome™; Apple Safari™; Rockmelt™; and so forth. Implementations also support the use of a web browser, such as the Amazon Silk™ browser, in which the processing of content is performed partly on the user device 102 and partly on other computing device(s).

In some cases, the item request application 104 may be configured to execute at least partly outside of a web browser. In such cases, the item request application 104 may be written in one or more programming languages such as Java™, C, C++, C#™, Objective-C™, and so forth. For example, the item request application 104 may be a native application written and compiled to execute on the particular hardware and operating system (OS) of the user device(s) 102.

In some implementations, the item request application 104 may be configured to enable a user of a user device 102(1) to generate an item request 106. The item request 106 may request that an item 108 be communicated to a recipient such as another user or a computing device. The item request 106 may specify data 110 to be included in the item 108 that is communicated to the recipient. In some cases, a recipient user may employ a user device 102(2) (or the user device 102(1)) to view or otherwise consume the item 108. For example, the item request application 104 may be configured to enable a first user to request that an item 108 such as a gift certificate be sent to a second user. The gift certificate may specify a monetary value or other value that is redeemable by the second user to acquire product(s) or service(s). The gift certificate may also include a personal message from the first user to the second user. The personal message may include a text message, an audio message, a video message, images, or any other format of data 110. In some cases, the item 108 may be a communication of text, video, audio, image(s), or other data 110 that does not include a transfer of monetary value.

In some implementations, the item request 106 may also include a communication channel identifier (ID) 112. The communication channel ID 112 may indicate a communication channel to be employed to communicate the item 108 to the recipient. Implementations support various communication channels, including but not limited to the following: communicating the item 108 in an email message; communicating the item 108 in a social network message; posting the item 108 to the recipient's social network page; presenting the item 108 on some other web page; sending the item 108 as a file that is formatted according to a version of the Portable Document Format' (PDF) developed by Adobe Systems of San Jose, Calif., United States or some other document format; sending the item 108 as a Short Message Service (SMS) or Multimedia Messaging Service (MMS) message; or employing a postal service or delivery service to deliver a physical copy of the item 108 to the recipient.

Because the personal message included as data 110 may be private, intimate, or otherwise personal between the individuals, the personal message may be described as sensitive data. The data 110 may also include other types of sensitive data. Sensitive data may refer to any information that is critical, personal, or private. Sensitive data may not be intended to be accessible by the generic public or by all personnel within a business or organization. For example, sensitive data may include financial information for customers or other users, such as bank account numbers, routing numbers, credit card numbers, other account information, financial history, and so forth. Sensitive data may also include personal identification information for customers or other users, such as names, social security numbers, addresses, email addresses, social network IDs, other account IDs, telephone numbers, and the like. Sensitive data may also include health care, health status information, medical history, or other health-related information associated with customers or other users.

The item request 106 may be communicated over one or more networks to one or more server devices 114. The server device(s) 114 may comprise any type of computing device(s), including but not limited to those types of devices described with reference to the user device(s) 102. Although examples herein may describe the server device(s) 114 as physical device(s), implementations are not so limited. In some cases, the server device(s) 114 may include one or more of a virtual computing environment, a hypervisor, a device emulation, or a virtual machine executing on one or more physical computing devices. In some cases, two or more of the server devices 114 may comprise a cluster, cloud, farm, or other grouping of multiple devices that coordinate operations to provide load balancing, failover support, parallel processing capabilities, shared storage resources, or other aspects. The server device(s) 114 are described further with reference to FIG. 5.

The server device(s) 114 may include a first execution environment 116 and a second execution environment 118 that is non-overlapping with the first execution environment 116. In some implementations, the first execution environment 116 may comprise a first portion of active (e.g., physical or runtime) memory that is employed by one or more processes executing on the server device(s) 114. The second execution environment 118 may comprise a second portion of the active memory, and processes executing within the second execution environment 118 may not have access to the first execution environment 116. The first execution environment 116 and the second execution environment 118 may also include separate portions of storage memory such as a hard drive on the server device(s) 114, and the storage memory included in the first execution environment 116 may be inaccessible to processes executing with the second execution environment 118. In some cases, the first execution environment 116 and the second execution environment 118 may include separate portions of a solid state drive. In some cases, the first execution environment 116 and the second execution environment 118 may be first and second instances of a virtual machine, runtime, hypervisor, emulation, or other container in which processes may execute. For example, the first execution environment 116 and the second execution environment 118 may be separate instances of a Java' Virtual Machine (JVM).

As shown in the example of FIG. 1, the first execution environment 116 may be implemented on a first set of one or more server devices 114(1) and the second execution environment 118 may be implemented on a second set of one or more server devices 114(2). In some implementations, the first execution environment 116 may include a first set of one or more computing devices, data storage devices, network infrastructure components, or other hardware devices. The first execution environment 116 may be at least partly segregated from the second execution environment 118 that includes a second set of hardware devices that is different than the first set. In some cases, the hardware or software components of the first execution environment 116 may have a first trust level, and the hardware or software components of the second execution environment 118 may have a second trust level that is different from the first trust level. The first trust level may be higher than the second trust level, such that the security measures to control access to the first execution environment 116 are more stringent than the security measures that control access to the second execution environment 118. For example, one or more users may be authorized to access the first execution environment 116, and a larger group of users may be authorized to access the second execution environment 118.

In some cases, the first execution environment 116 may include one or more computing devices that communicate with one another over a network that is segregated or otherwise separate from a broader network that includes the second execution environment 118. The computing devices within the first execution environment 116 may be accessible by authorized users through secured, locked, or guarded physical locations, or through secure network connections. In some cases, the authorized users may have undergone a background check or other security procedures to gain access to the first execution environment 116. Further, the computing, storage, and network infrastructure of the first execution environment 116 may be self-contained and at least partly isolated from computing devices and networks in the second execution environment 118 to prevent unauthorized leaking of the sensitive data outside the first execution environment 116. In some cases, users may also require some level of authorization to access the second execution environment 118. A larger number of users may be authorized to access the second execution environment 118 than are authorized to access the first execution environment 116.

In some implementations, the server device(s) 114 may execute a request handling module 120 within the first execution environment 116. The request handling module may receive the item request 106. The request handling module 120 may place the data 110 in memory that is included in, or accessible from, the first execution environment 116. In some implementations, the data 110 received in the item request 106 may be stored in storage memory in the first execution environment 116. Alternatively, the data 110 may be placed into active memory in the first execution environment 116. For example, one or more data structures, variables, objects, or other portions of runtime memory may be instantiated or otherwise created in active memory to hold the data 110 for examination and processing. While in the first execution environment 116, the data 110 may be accessible by software modules executing within the first execution environment 116 but inaccessible to software modules executing with the second execution environment 118.

The server device(s) 114 may execute, within the first execution environment 116, a data examination module 122. The data examination module 122 may expose, export or otherwise provide a set of one or more functions that are callable by other modules executing in the first execution environment 116 or the second execution environment 118. In some cases, the data examination module 122 may comprise an interface of callable function(s), such as an application programming interface (API). The callable function(s) provided by the data examination module 122 may be configured to examine various portions of the data 110. The data examination module 122 is described further with reference to FIG. 3.

The server device(s) 114 may execute, in the second execution environment 118, a requirements module 126. After the data 110 is stored or otherwise placed in the first execution environment 116, the request handling module may perform one or more operations 124 to instruct the requirements module 126 to begin making calls to the function(s) exposed by the data examination module 122. Such function calls may test whether the data 110 complies with one or more requirements. The requirement(s) may include constraints on the size, format, or other aspects of the data 110. For example, a personal message included in the data 110 may be limited to a maximum length of 512 characters, or an email address may be limited to a maximum length of 50 characters. As another example, an email address may be constrained to one or more predetermined formats for email addresses. As another example, the value of a portion of the data 110 may be required to be in a predetermined list of allowed values for that portion of the data 110. The requirements module 126 is described further with reference to FIG. 2.

In some cases, the requirements may correspond to the communication channel to be employed to communicate the item 108 to the recipient(s). In such cases, the operation(s) 124 may include sending the communication channel ID 112 to the requirements module 126. The requirements module 126 may then determine, based on the communication channel, the requirements to be satisfied by the data 110. For example, a personal message may have a maximum length of 256 characters when the item 108 is communicated by email, and a personal message may have a maximum length of 100 characters when the item 108 is communicated in a SMS message. As another example, an image to be included in the item 108 may have a first format when the item is communicated in a social network post, and a second format when the item 108 is presented within some other web page. The requirements may constrain the various portions of the data 110 to be presentable within the display limitations of the communication channel.

For each of the requirement(s) corresponding to the communication channel ID 112, the requirements module 126 may call a function exposed by the data examination module 122 to determine whether the data 110 complies with the requirement. In one or more operations 128, the requirements module 126 may call one or more functions of the data examination module 122 and receive one or more results (e.g., return values) returned by the called function(s). In some cases, a function exposed by the data examination module 122 may be configured to take, as an input parameter, an identification of the portion of the data 110 to be tested for compliance with a requirement. In some cases, the data 110 may be parameterized such that the data 110 includes multiple designated portions that are identified via metadata in the data 110. For example, the data 110 may include portions such as a personal message, a recipient email address, gift certificate value token, an image, a personalized video message, a personalized audio message, and so forth. Each of the portion(s) may be tested for compliance with one or more requirements that are associated with the portion. For example, an email address may be required to be present, of a certain format, and of a maximum length. An image may be required to have a format that is included in a list of allowed formats.

Figure 8:
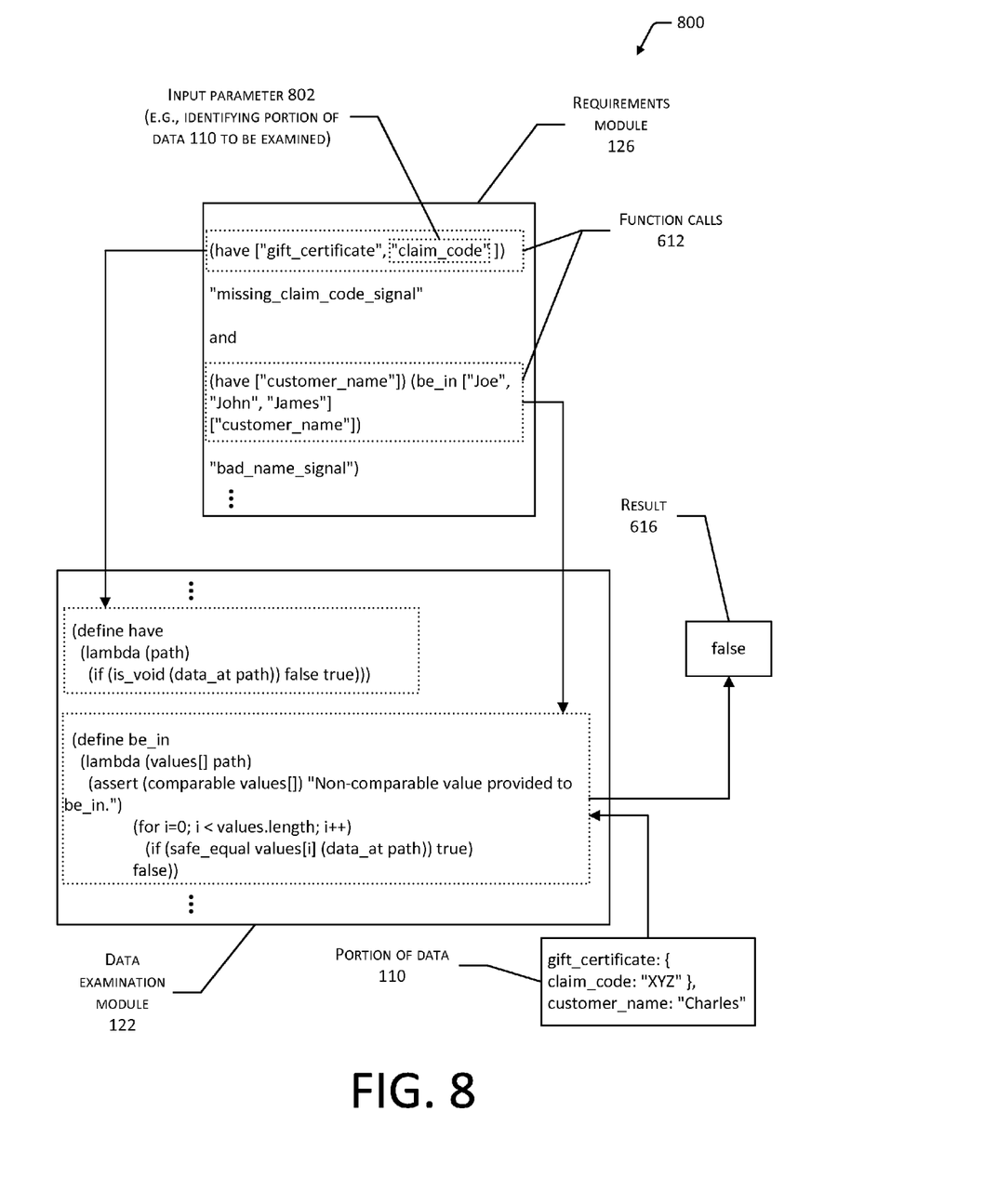
FIG. 8 depicts an example of containerized examination of data, including determining whether a portion of data complies with requirements.

Each of the function(s) of the data examination module 122 may be configured to return a result indicating whether the data 110 complies with the tested requirement. In some implementations, the result may be a binary result indicating one of two possible results—compliance or non-compliance. Alternatively, the result may indicate compliance via a return value of TRUE or NULL. In some implementations, the result may not include the tested portion of the data 110. Thus, implementations enable the examination of the data 110 without the data 110 leaking outside of the first execution environment 116. FIG. 8 depicts an example of calling a function to test whether a portion of the data 110 complies with one or more requirements.

The requirements module 126 may employ the result(s) of the function call(s) to determine whether one or more portions of the data 110 comply with one or more requirements. Based on the result(s), the requirements module 126 may perform one or more operations 130 to communicate compliance information to the request handling module 120. The compliance information may indicate that the data 110 satisfies, or does not satisfy, one or more requirements. The request handling module 120 may update status information 132 based on an indication of unsatisfied requirements, or an indication of satisfied requirements. In some implementations, the status information 132 may be stored in memory that is accessible from the first execution environment 116. The status information 132 may indicate a status of the item 108 to be sent. When the status information 132 indicates that all the requirement(s) for the data 110 have been satisfied, e.g., all the requirement(s) corresponding to the requested communication channel ID 112, the request handling module 120 may perform one or more operations 134 to communicate the item 108 to the recipient user device(s) 102(2) or to the recipient user(s) identified in the item request 106. The item 108 may be communicated via the communication channel corresponding to the communication channel ID 112 specified in the item request 106.

The item 108 may be presented within an item presentation application 136 executing on the recipient user device 102(2). In some cases, the item presentation application 136 may be associated with the particular communication channel used to communicate the item 108. For example, an item 108 communicated within an email message may be presented within an item presentation application 134 such as an email client.

In some implementations, when the operation(s) 130 indicate that a requirement has not been satisfied, the request handling module 120 may generate and send a notification indicating that the requirement is not satisfied. Such a notification may be sent to the user device 102(1) or the user who generated the item request 106 through the item request application 104. In some cases, the notification may be presented within the item request application 104 as an error message, warning, or request to correct the portion of the data 110 that is non-compliant with the requirement.

In some cases, other process(es) may contribute to the item 108 to be sent, and the status information 132 may indicate whether those other process(es) have completed. For example, a video message included in the data 110 may be transcoded into another format by an asynchronous process prior to the sending of the item 108, and that asynchronous process may update the status information 132 when the transcoding is complete. As another example, an asynchronous process may process a specified payment method to generate a token that conveys value to the recipient within a gift certificate item 108. That asynchronous process may update the status information 132 when the payment processing is complete and successful. In such cases, the transcoded video file or payment token may be added to the item 108 itself when the respective processing is complete. Such additional processing may be described as additional requirement(s) in the item request 106.

Access to the potentially sensitive data 110, such as personal messages, payment information, user names and addresses, and so forth, may be restricted to the first execution environment 116 that is accessible to a limited number of software modules such as the data examination module 122. Accordingly, the error messages, exceptions, log files, auditing data, or other information that may be emitted by the data examination module 122 or other modules executing within the first execution environment 116 may remain within the first execution environment 116 and may not leak into the second execution environment 118. In some implementations, the result(s) returned by the function(s) of the data examination module 122 may not include any portion of the data 110. Accordingly, the sensitive data 110 may not be inadvertently leaked via the error messages, exceptions, log files, auditing data, or other information that may be emitted by the requirements module 126, or by other modules executing within the second execution environment 118. Thus, implementations provide for a containerized examination of sensitive data 110 that mitigates the possibility that such sensitive data may inadvertently leak to unauthorized processes or individuals.

Implementations may ensure the privacy, confidentiality, and security of the data 110 associated with one or more users. In some cases, the collection and use of the data 110 may be contingent on the user(s) giving explicit permission (e.g., opting in) for the collection and use of the data 110. In some cases, the collection and use of the data 110 may be discontinued based on the user(s) withdrawing permission (e.g., opting out) for the collection and use of such data 110.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 2:
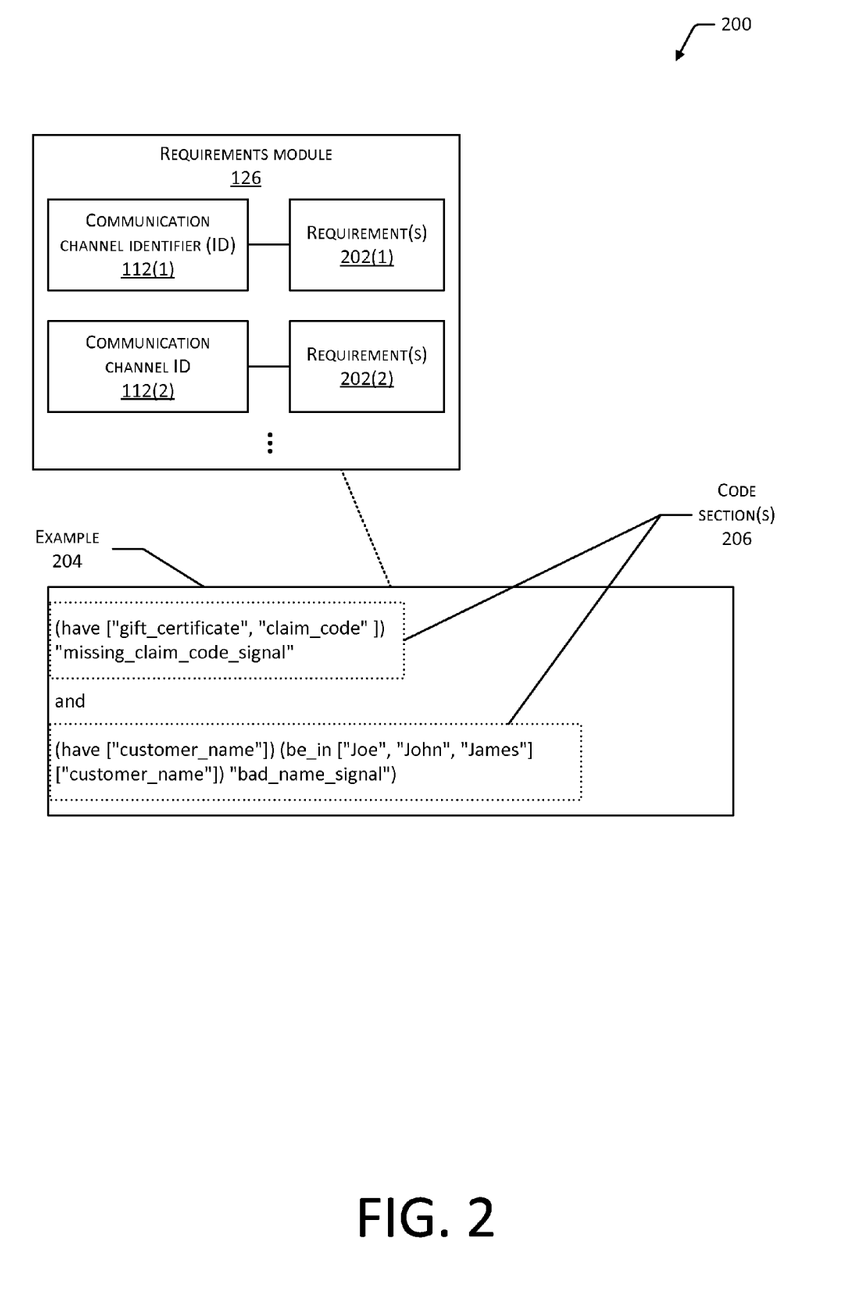
FIG. 2 depicts an example of a requirements module including one or more function calls to test whether data satisfies one or more requirements.

FIG. 2 depicts an example schematic 200 of the requirements module 126 including instructions to test for one or more requirements 202. As shown in FIG. 2, the requirements module 126 may describe one or more sets of requirement(s) 202 for each of one or more communication channel IDs 112. The requirements 202 may be applied to the data 110 that is communicated in an item 108 using the communication channel identified by the communication channel ID 112. Example 204 depicts example instructions that may be included in the requirements module 126. As shown in the example 204, the requirements module 126 may include any number of code sections 206 (e.g., classes, subroutines, functions, code blocks, etc.) that are each associated with a communication channel ID 112 (e.g., "email"). A code section 206 may describe any number of requirements 202 that the data 110 may satisfy to be communicated via the communication channel. Although FIG. 2 depicts the requirements module 126 as being described using a particular language, implementations support other formats or languages for the requirements module 126. In some cases, the requirements module 126 may be described using a version of the JavaScript™ Object Notation (JSON) format. In some implementations, the requirements to be applied to the data 110 may be communicated to the requirements module 126 from the request handling module 120 in the operation(s) 124.

A code section 206 of the requirements module 126 may include any number of calls into the functions exported by the data examination module 122. A function call may be associated with a particular communication channel ID 112. Alternatively, one or more function calls may be applicable to multiple communication channels. A function call may test whether a particular portion of the data 110 satisfies one or more requirements 202. For example, the function call "(have ["recipient_name"])" may test whether the data 110 "has" a portion that is the "recipient_name." A code section 206 may also include a signal, such as an error code or error message, to be returned if a function call returns a result indicating that a requirement 202 is not satisfied. For example, a code section 206 "(have ["recipient_name"])" may include instructions to emit the "missing_recipient_name_signal" if the return value of the function call indicates that the "recipient_name" is not present in the data 110. The returned signal(s) may be a numeric data type or any other data type.

The requirements module 126 may be written using any programming language. In some implementations, the requirements module 126 may be written in a domain specific language (DSL) such that the code sections 206 of the requirements module 126 are applicable to test a particular type of the data 110. For example, the requirements module 126 may be configured to test for requirement(s) 202 of data 110 that is to be communicated in a gift certificate item 108.

In some cases, a code section 206 of the requirements module 126 may test for a single requirement 202. Alternatively, a code section 206 may test for multiple requirements 202, which may be combined using logical operators. For example, a code section 206 may test whether an email address is formatted as an email address (e.g., username@domain) and has a length that is less than or equal to a maximum length. A code section 206 may also test whether a text portion of the data 110 complies with a regular expression specified in an input parameter to the called function.

Implementations support the use of any number or type of requirements 202, including but not limited to the following:

Requirements 202 that a particular portion of the text data 110 is in a particular format, such as a properly formatted email address or Uniform Resource Locator (URL), or that an audio, video, or image be formatted according to a particular audio, video, or image format;

Requirements 202 that a particular portion of the data 110 is within a range of lengths or sizes, such as that the data 110 be no greater than a maximum length or size, e.g., that a personal message not exceed a maximum length;

Requirements 202 that a particular portion of the data 110 has a value that is included in a list of allowed values for that portion of the data 110, e.g., that a social network ID of the recipient corresponds to one of a list of supported social networks; or Requirements 202 that a particular portion of the data 110 is present in the data 110, e.g., that a claim code or gift certificate value token is present in the item 108.

Figure 3:
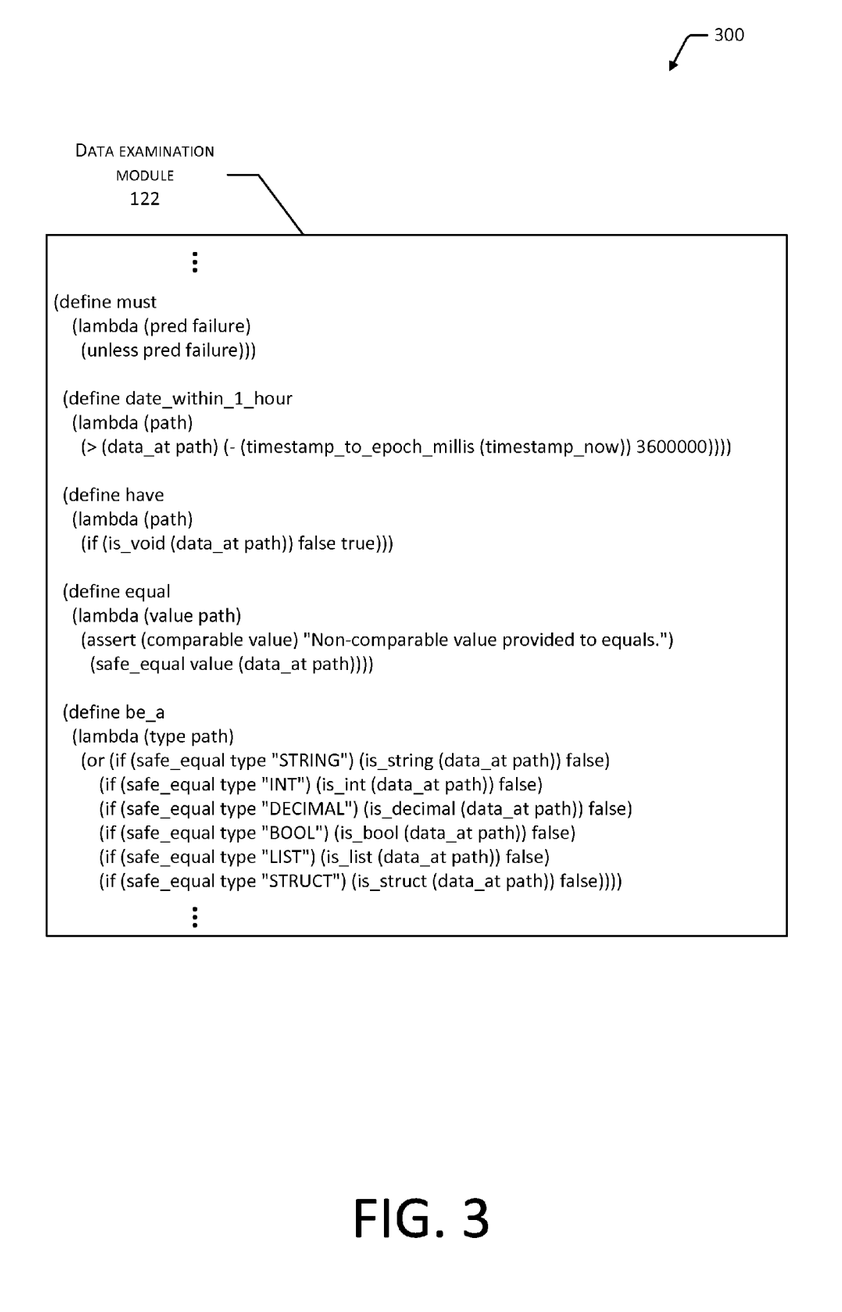
FIG. 3 depicts an example of a data examination module including one or more functions which may be callable to determine whether data complies with requirements.

FIG. 3 depicts an example 300 of the data examination module 122 including one or more functions that are callable to determine whether the data 110 complies with the requirement(s) 202. As shown in the example 300, the data examination module 122 may export, expose, provide, or otherwise include any number of functions that are callable by other modules. Each function may be callable to test a particular aspect of a portion of the data 110. For example, a function named "equal" may test whether a value (e.g., "value") provided as a first input parameter is equal to a portion of the data 110 indicated by a second input parameter (e.g., "path"). As another example, a function named "have" may test whether the portion of the data 110 indicated by an input parameter (e.g., "path") is present in the data 110.

A function may have a return value indicating the result of the tested condition on the data. In some cases, the return value may be a Boolean true or false. Although FIG. 3 depicts the data examination module 122 as being described using a particular language, implementations support other formats or languages for the data examination module 122.

Figure 4:
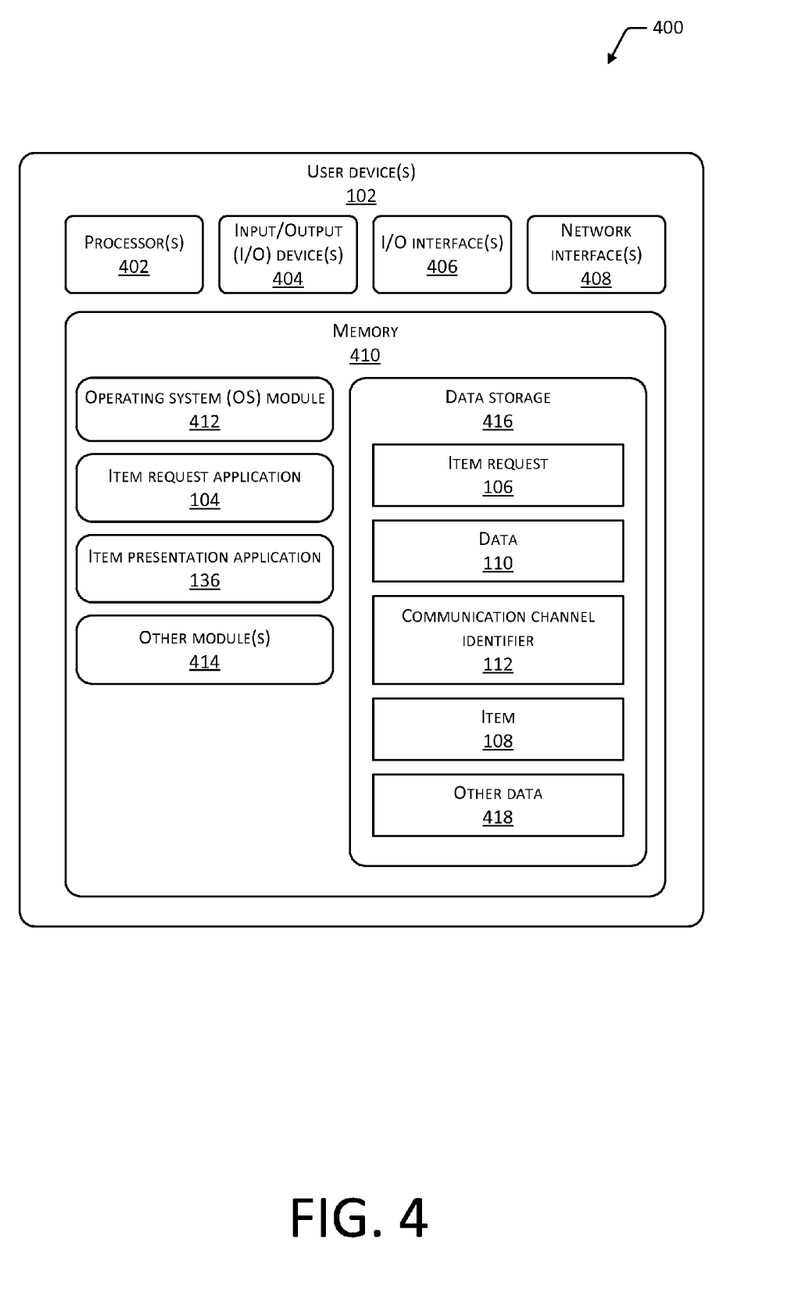
FIG. 4 depicts a block diagram of an example of user device(s) from which an item may be requested.

FIG. 4 depicts a block diagram 400 of an example of the user device(s) 102. As shown in the block diagram 400, the user device(s) 102 may include one or more processors 402 (e.g., hardware-based processor(s)) configured to execute one or more stored instructions. The processor(s) 402 may comprise one or more cores.

The user device(s) 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the user device(s) 102 or may be externally placed.

The user device(s) 102 may include one or more I/O interfaces 406 to enable components or modules of the user device(s) 102 to control, interface with, or otherwise communicate with the I/O device(s) 404. The I/O interface(s) 406 may enable information to be transferred in or out of the user device(s) 102 or between components of the user device(s) 102 through serial communication, parallel communication, or other types of communication. For example, the I/O interface(s) 406 may comply with a version of the RS-232 standard for serial ports or with a version of the Institute of Electrical and Electronics Engineers (IEEE) 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The user device(s) 102 may also include one or more busses or other internal communications hardware or software that allow for the transfer of data between the various modules and components of the user device(s) 102.

The user device(s) 102 may include one or more network interfaces 408 that enable communications between the user device(s) 102 and other network accessible computing devices, such as the server device(s) 114. The network interface(s) 408 may include one or more network interface controllers (NICs) or other types of transceiver devices configured to send and receive communications over a network.

The user device(s) 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the user device(s) 102. In some implementations, the memory 410 may provide storage of computer-readable instructions or other information in a non-transitory format.

The memory 410 may include an OS module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux™ operating system; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 410 may include one or more of the modules described above as executing on the user device(s) 102, such as the item request application 104 and the item presentation application 136. The memory 410 may also include one or more other modules 414, such as a user authentication module or an access control module to secure access to the user device(s) 102, and so forth.

The memory 410 may include data storage 416 to store data for operations of the user device(s) 102. The data storage 416 may comprise a database, array, structured list, tree, or other data structure, and may be a relational or a non-relational datastore. The data storage 416 may store one or more of the types of data described above as being present on the user device(s) 102, including but not limited to the item request 106, the data 110, the communication channel ID 112, and the item 108. The data storage 416 may also store other data 418 such as user authentication information, access control data, or other information. In some implementations, at least a portion of the information stored in the data storage 416 may be stored externally to the user device(s) 102, on other devices that may communicate with the user device(s) 102 via the I/O interface(s) 406 or via the network interface(s) 408.

Figure 5:
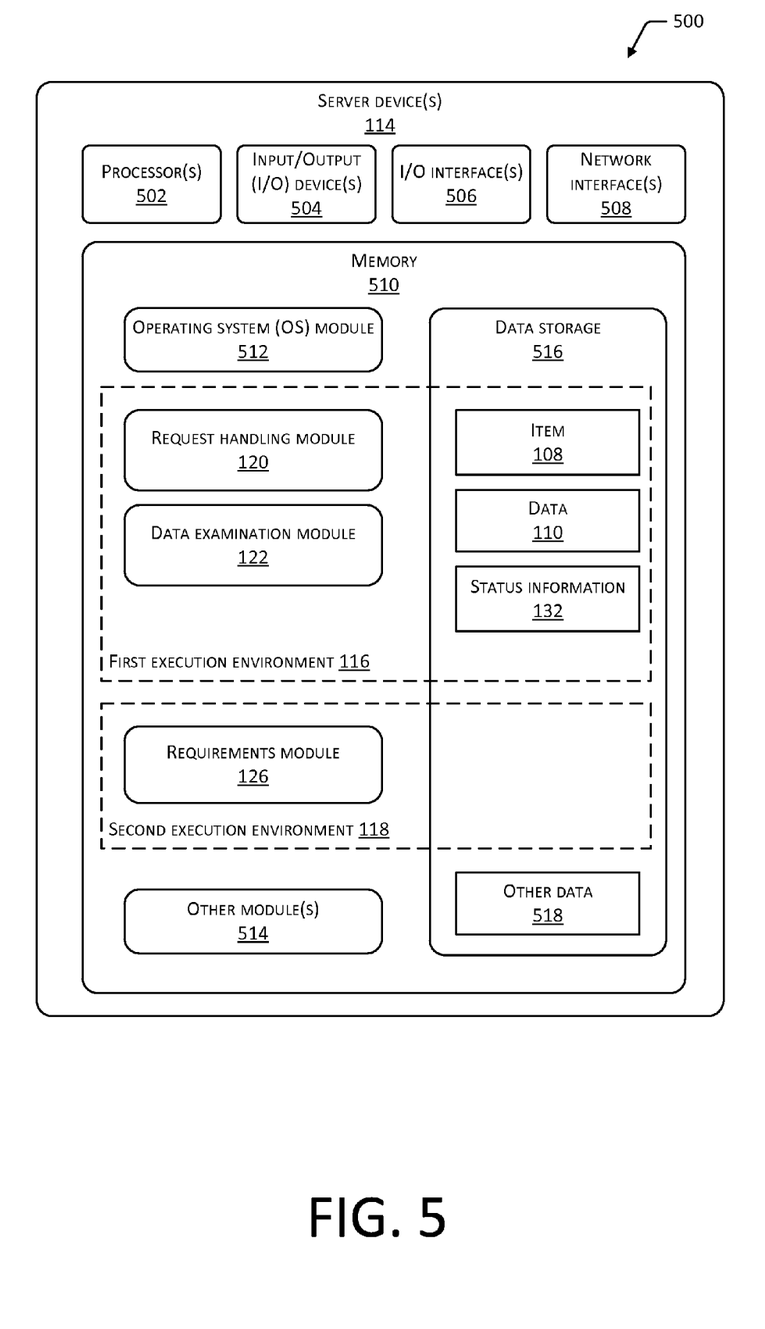
FIG. 5 depicts a block diagram of an example of server device(s) configured for containerized examination of data.

FIG. 5 depicts a block diagram 500 of an example of the server device(s) 114. As shown in the block diagram 500, the server device(s) 114 may include one or more processors 502 (e.g., hardware-based processor(s)) configured to execute one or more stored instructions. The processor(s) 502 may comprise one or more cores. The server device(s) 114 may include one or more I/O devices 504, one or more I/O interfaces 506, and one or more network interfaces 508 as described above respectively with reference to the I/O device(s) 404, the I/O interface(s) 406, and the network interface(s) 408.

The server device(s) 114 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The OS module 512 may execute within one or more of the first execution environment 116 or the second execution environment 118.

The memory 510 may include one or more of the modules described above as executing on the server device(s) 114, such as the request handling module 120 and the data examination module 122 executing within the first execution environment 116 and the requirements module 126 executing within the second execution environment 118. The memory 510 may also include one or more other modules 514, such as a user authentication module or an access control module to secure access to the server device(s) 114, and so forth. The other module(s) 514 may execute within one or more of the first execution environment 116 or the second execution environment 118.

The memory 510 may include the data storage 516, which may store data for operations of the server device(s) 114. The data storage 516 may comprise a database, array, structured list, tree, or other data structure, and may be a relational or a non-relational datastore. The data storage 516 may store data such as that described above as present on the server device(s) 114, including one or more of the item 108, the data 110, or the status information 132 present in the first execution environment 116. The data storage 516 may also store other data 518, such as user authentication information or access control data. The other data 518 may be included in one or more of the first execution environment 116 or the second execution environment 118. In some implementations, at least a portion of the information stored in the data storage 516 may be stored externally to the server device(s) 114 on other devices that may communicate with the server device(s) 114 via the I/O interface(s) 506 or via the network interface(s) 508.

Figure 6:
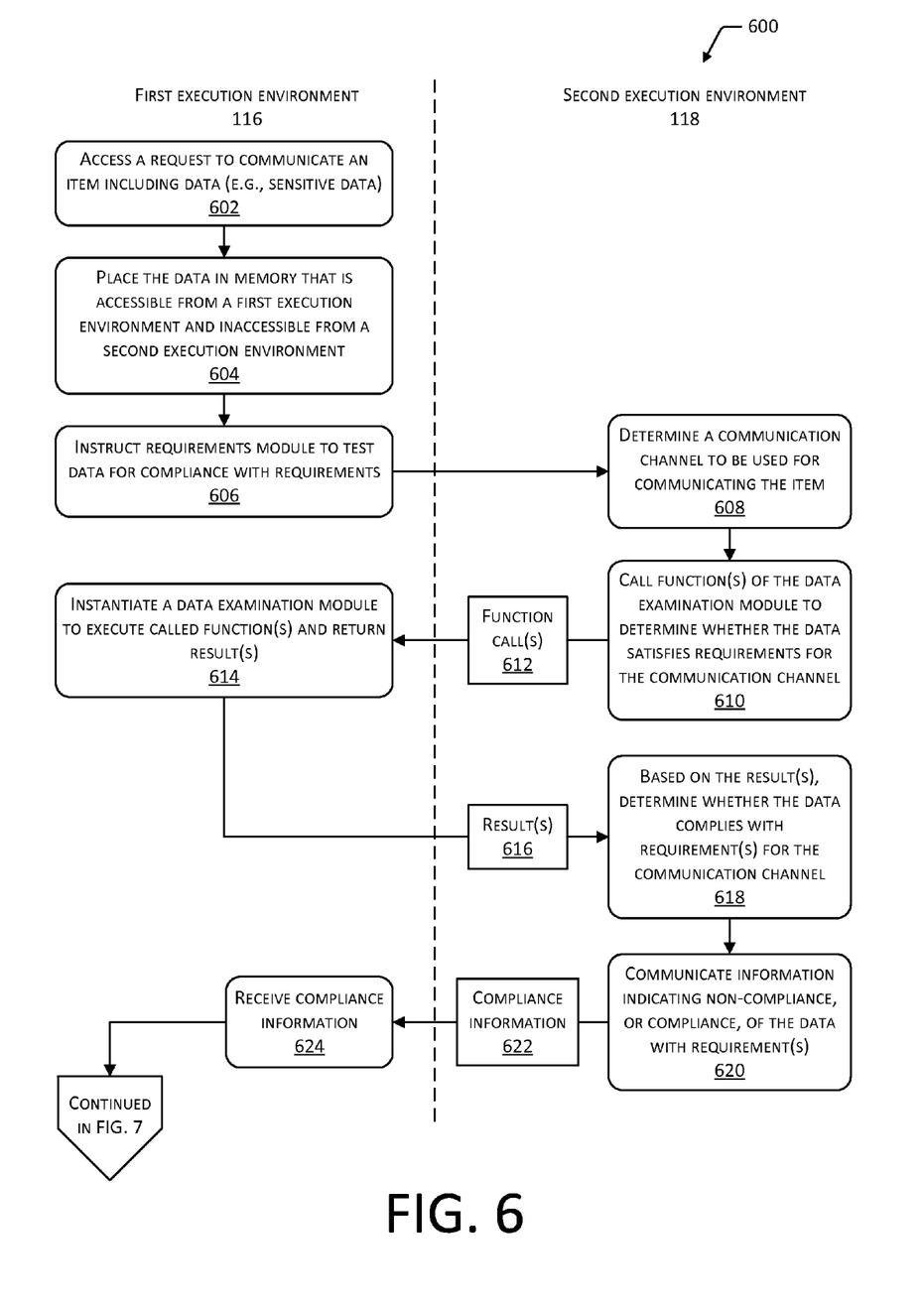
FIG. 6 depicts a flow diagram of a process for containerized examination of data.
Figure 7:
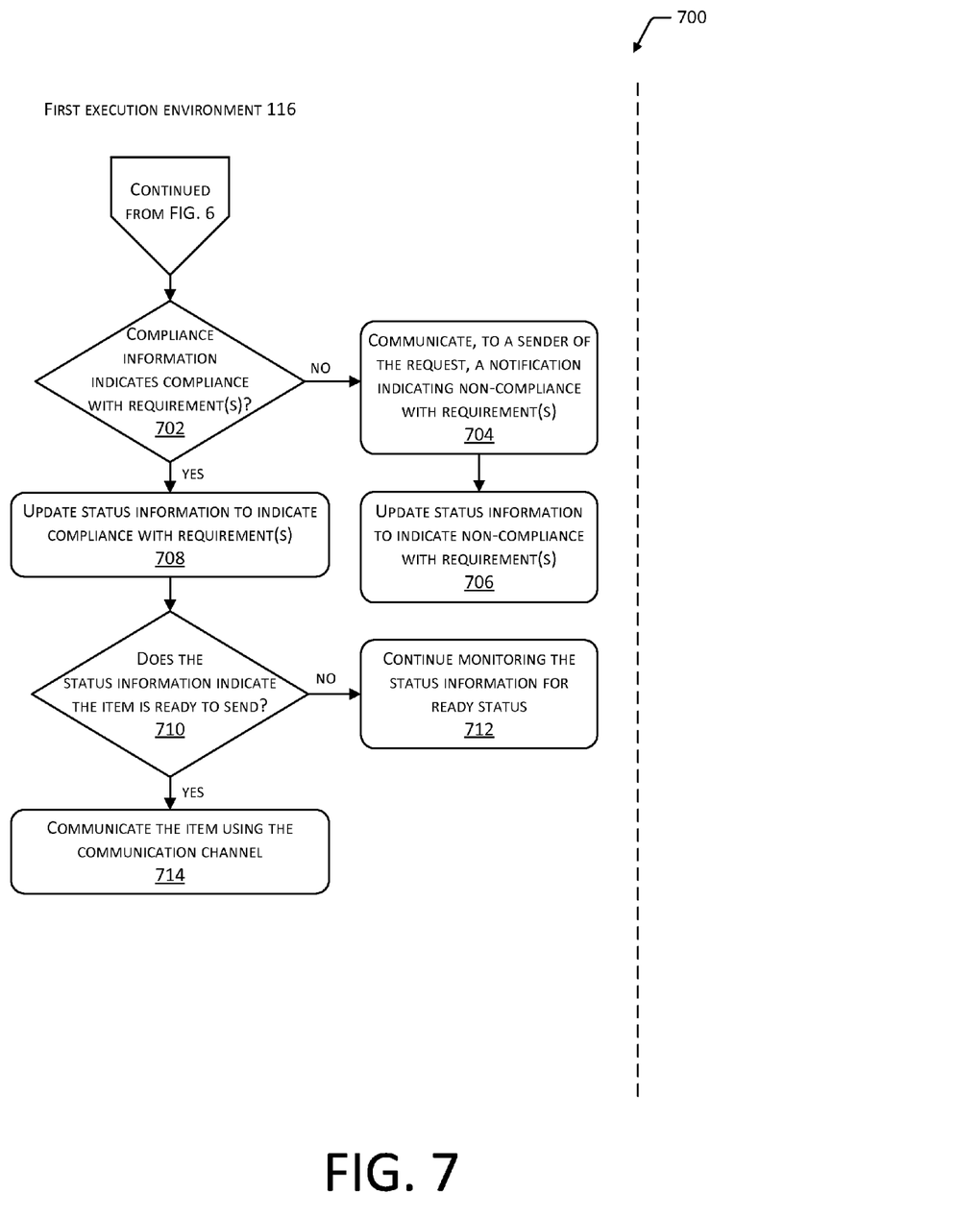
FIG. 7 depicts a flow diagram of a continuation of the process for containerized examination of data.

FIGS. 6 and 7 depict flow diagrams 600 and 700 of a process for containerized examination of the data 110. Operations of the process may be performed by the item request application 104, the item presentation application 136, the other module(s) 414 executing on the user device(s) 102, the request handling module 120, the data examination module 122, the requirements module 126, the other module(s) 514 executing on the server device(s) 114, or other modules executing on other device(s).

At 602, the item request 106 may be accessed. As described with reference to FIG. 1, the item request 106 may have been generated by the item request application 104 to request that an item 108 be communicated to one or more recipients. The item request 106 may describe the data 110 to be included in the communicated item 108.

At 604, the data 110 may be placed in memory that is included in, or that is otherwise accessible from, the first execution environment 116. While in the first execution environment 116, the data 110 may be accessible by software modules executing in the first execution environment 116 but not accessible by software modules executing in the second execution environment 118 or elsewhere.

At 606, the request handling module 120 may instruct the requirements module 126 or another module to test the data 110 for compliance with requirements 202.

At 608, a determination is made of a communication channel to be employed in sending the requested item 108 to the recipient(s). In some implementations, the communication channel may be indicated by the communication channel ID 112 included in the item request 106.

At 610, the requirements module 126, or some other module executing in the second execution environment 118, may be employed to perform one or more function calls 612 calling one or more functions of the data examination module 122 to determine whether the data 110 satisfies the requirement(s) 202 for the communication channel. In some implementations, the requirements module 126 may be executed to perform the function call(s) 612.

At 614, the data examination module 122 may be employed to execute the called function(s) and return one or more results 616 of the function call(s) 612. In some implementations, employing the data examination module 122 may include instantiating (e.g., creating an instance of) the data examination module 122 in runtime memory, and employing the instance to execute the called function(s).

At 618, based on the result(s) 616 a determination may be made whether the data 110 complies with the requirement(s) 202 for the communication channel. For example, if a call to a function "have" with the input parameter "recipient_name" returns a value "false", a determination may be made that the data 110 does not comply with a requirement 202 that the data 110 includes a recipient name for sending the item 108.

At 620, the requirements module 126 or some other module may communicate compliance information 622 to the request handling module 120. The compliance information 622 may indicate that the data 110 complies, or does not comply, with the requirement(s) 202 associated with the communication channel.

At 624, the compliance information 622 may be received by the data handling module 120 or another module executing in the first execution environment 116. The process may continue as described with reference to FIG. 7.

At 702, a determination is made whether the compliance information 622 indicates compliance, or non-compliance, of the data 110 with the requirement(s) 202. If the compliance information 622 indicates compliance, the process may proceed to 708. If the compliance information 622 indicates non-compliance, the process may proceed to 704. At 704, a notification may be communicated to the sender of the item request 106 (e.g., the user of the user device 102(1)) to indicate that the data 110 does not comply with one or more requirements 202. At 710, the status information 132 may be updated to indicate that the data 110 does not comply with one or more requirements 202.

At 708, the status information 132 may be updated to indicate that the data 110 complies with one or more requirements 202. In some cases, the process may return to 610 and make additional function call(s) 612 to determine whether the data 110 complies with other requirement(s) 202.

At 710, a determination is made whether the status information 132 indicates that the item 108 is ready to send to the recipient(s). If not, the process may proceed to 712 and continue monitoring the status information 132 for a ready status of the item 108. If the status information 132 indicates a ready status of the item 108, the process may proceed to 714 and communicate the item 108 to the recipient(s) using the communication channel indicated in the item request 106.

FIG. 8 depicts an example 800 of containerized examination of the data 110 employing the data examination module 122 executing in the first execution environment 116. In the example 800, the function call(s) 612 "(have ["gift_certificate", "claim_code" ])" and "(have ["customer_name"]) (be_in ["Joe", "John", "James"] ["customer_name"])" are performed by the requirements module 126 to test a particular portion of the data 110. The function call 612 "(have ["gift_certificate", "claim_code" ])" tests whether a particular portion of the data 110 is present, e.g. the gift certificate claim code to be employed by the recipient for redeeming the gift certificate. The function call 612 "(have ["customer_name"]) (be_in ["Joe", "John", "James"] ["customer_name"])" tests whether a particular portion of the data 110 (e.g., "customer_name") has a value that is included in a list of allowed values (e.g., "Joe", "John", or "James"). Because the tested portion of the data 110 includes a "customer_name" of "Charles", the called function of the data examination module 122 emits the result 616 "bad_name_signal" to indicate that the "customer_name" is not in the list of allowed values. The result 616 may be included in the compliance information 624 that is sent to the request handling module 120 and employed by the request handling module 120 to update the status information 132.

In some cases, the function call 612 may be configured to take an input parameter 802 that indicates the portion of the data 110 to be tested for compliance with the requirement 202. As described above, the data 110 may be parameterized into a plurality of portions, such as an email address, recipient name, sender name, personal message, gift certificate claim code, image(s), and so forth. In some cases, the input parameter 802 may be a path to a location, in the data 110, of the portion to be tested.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
  accessing a request to communicate an item including data;
  storing the data in memory that is accessible from a trusted execution environment and inaccessible from an untrusted execution environment;
  in the trusted execution environment, employing a data examination module that includes a function callable by one or more other modules in the untrusted execution environment, wherein the function is configured to:
    receive an input parameter that identifies a portion of the data;
    examine the portion of the data; and
    provide a result of examining the portion of the data without emitting the portion of the data outside of the trusted execution environment;
  in the untrusted execution environment, employing a requirements module that calls the function to examine the portion of the data in the trusted execution environment;
  in the untrusted execution environment, receiving the result from the function, the result not including the portion of the data;
  in the untrusted execution environment, employing the result to determine whether the portion of the data complies with a requirement;
  responsive to the result indicating that the portion of the data complies with a requirement, communicating compliance information from the untrusted execution environment to the trusted execution environment; and
responsive to receiving the compliance information from the untrusted execution environment, communicating, by the trusted environment, the item including the data.

2. The method of claim 1, further comprising:
determining a communication channel to be used for communicating the item, the communication channel identified in the request;
determining the requirement corresponding to the communication channel; and
determining the function to call to examine the portion of the data for compliance with the requirement.

3. The method of claim 1, wherein the requirement includes one or more of:
the portion of the data is not null;
a length of the portion of the data is bounded by a maximum length;
the portion of the data is included in a list of allowed values; or
a format of the portion of the data corresponds to an allowed format.

4. The method of claim 1, further comprising:
responsive to the result indicating that the portion of the data does not comply with the requirement, generating, in the untrusted execution environment, a notification that describes a non-compliance of the portion of the data with the requirement.

5. The method of claim 1, wherein the data comprises sensitive data associated with one or more of a sender of the request or a recipient of the item.

6. A system, comprising:
a memory that is accessible from a first execution environment and inaccessible from a second execution environment; and
at least one computing device configured to implement a plurality of modules including:
a data examination module that executes in the first execution environment, the data examination module configured to provide a function that examines the data in the memory without emitting the data outside of the first execution environment;
a requirements module that executes in the second execution environment, the requirements module configured to:
call the function of the first execution environment to cause the examining of a portion of the data;
receive, from the first execution environment, a result from the function, the result not including the portion of the data;
employ the result to determine whether the portion of the data complies with a requirement; and
responsive to the result indicating that the portion of the data complies with the requirement, communicate compliance information to the first execution environment; and
a request handling module executing in the first execution environment, the request handling module configured to:
receive the compliance information from the second execution environment;
update status information to indicate that the portion of the data complies with the requirement; and
communicate, from the first execution environment, the data in response to a request.

7. The system of claim 6, wherein the request handling module executing in the first execution environment is further configured to:
responsive to the result indicating that the portion of the data does not comply with the requirement, update the status information to indicate that the portion of the data does not comply with the requirement; and
communicate, to a provider of the data, a notification that describes a non-compliance of the portion of the data with the requirement.

8. The system of claim 6, wherein the requirement includes one or more of:
the portion of the data is not null;
a length of the portion of the data is bounded by a maximum length;
the portion of the data is included in a list of allowed values; or
a format of the portion of the data corresponds to an allowed format.

9. The system of claim 6, wherein the request handling module is further configured to:
communicate, in response to the request, an item that includes the data, responsive to a determination that the status information indicates that the data complies with a set of requirements that includes the requirement.

10. The system of claim 9, wherein:
the item is communicated using a communication channel; and
the set of requirements corresponds to the communication channel.

11. The system of claim 9, wherein the data comprises sensitive data associated with one or more of a provider of the data or a recipient of the item.

12. The system of claim 6, wherein the function is configured to:
receive an input parameter that identifies the portion of the data;
examine the portion of the data; and
provide the result of examining the portion of the data without emitting the portion of the data outside of the first execution environment.

13. One or more non-transitory computer-readable media storing instructions which, when executed by at least one processor, instruct the at least one processor to perform actions comprising:
in a first execution environment, employing a first module that includes a function callable by one or more other modules, wherein the function is configured to examine data stored in memory that is accessible from the first execution environment and inaccessible from a second execution environment;
in the second execution environment, employing a second module that calls the function in the first execution environment to cause the examining of a portion of the data in the first execution environment;
in the second execution environment, receiving a result from the function in the first execution environment, the result not including the portion of the data;
employing the result to determine whether the portion of the data complies with a requirement;
responsive to the result indicating that the portion of the data complies with the requirement, communicating compliance information to the first execution environment;
responsive to receiving by the first execution environment the compliance information from the second execution environment; updating status information to indicate that the portion of the data complies with the requirement; and communicating, by the first execution environment, the data in response to a request.

14. The one or more non-transitory computer-readable media of claim 13, wherein the actions further comprise:
responsive to the result indicating that the portion of the data does not comply with the requirement, communicating compliance information to the first execution environment;
responsive to receiving by the first execution environment the compliance information from the second execution environment, updating the status information to indicate that the portion of the data does not comply with the requirement.

15. The one or more non-transitory computer-readable media of claim 13, wherein the requirement includes one or more of:
the portion of the data is not null;
a length of the portion of the data is bounded by a maximum length;
the portion of the data is included in a list of allowed values; or
a format of the portion of the data corresponds to an allowed format.

16. The one or more non-transitory computer-readable media of claim 13, wherein the communicating, by the first execution environment, the data further comprise:
communicating an item that includes the data, responsive to a determination that the status information indicates that the data complies with a set of requirements that includes the requirement.

17. The one or more non-transitory computer-readable media of claim 16, wherein:
the item is communicated using a communication channel; and
the set of requirements corresponds to the communication channel.

18. The one or more non-transitory computer-readable media of claim 16, wherein the data comprises sensitive data associated with one or more of a provider of the data or a recipient of the item.

19. The one or more non-transitory computer-readable media of claim 13, wherein the actions further comprise:
responsive to the result indicating that the portion of the data does not comply with the requirement, generating a notification that describes a non-compliance of the portion of the data with the requirement.

20. The one or more non-transitory computer-readable media of claim 13, wherein the function is further configured to:
receive an input parameter that identifies the portion of the data;
examine the portion of the data; and
provide the result of examining the portion of the data without emitting the portion of the data outside of the first execution environment.

* * * * *